Figure 1:
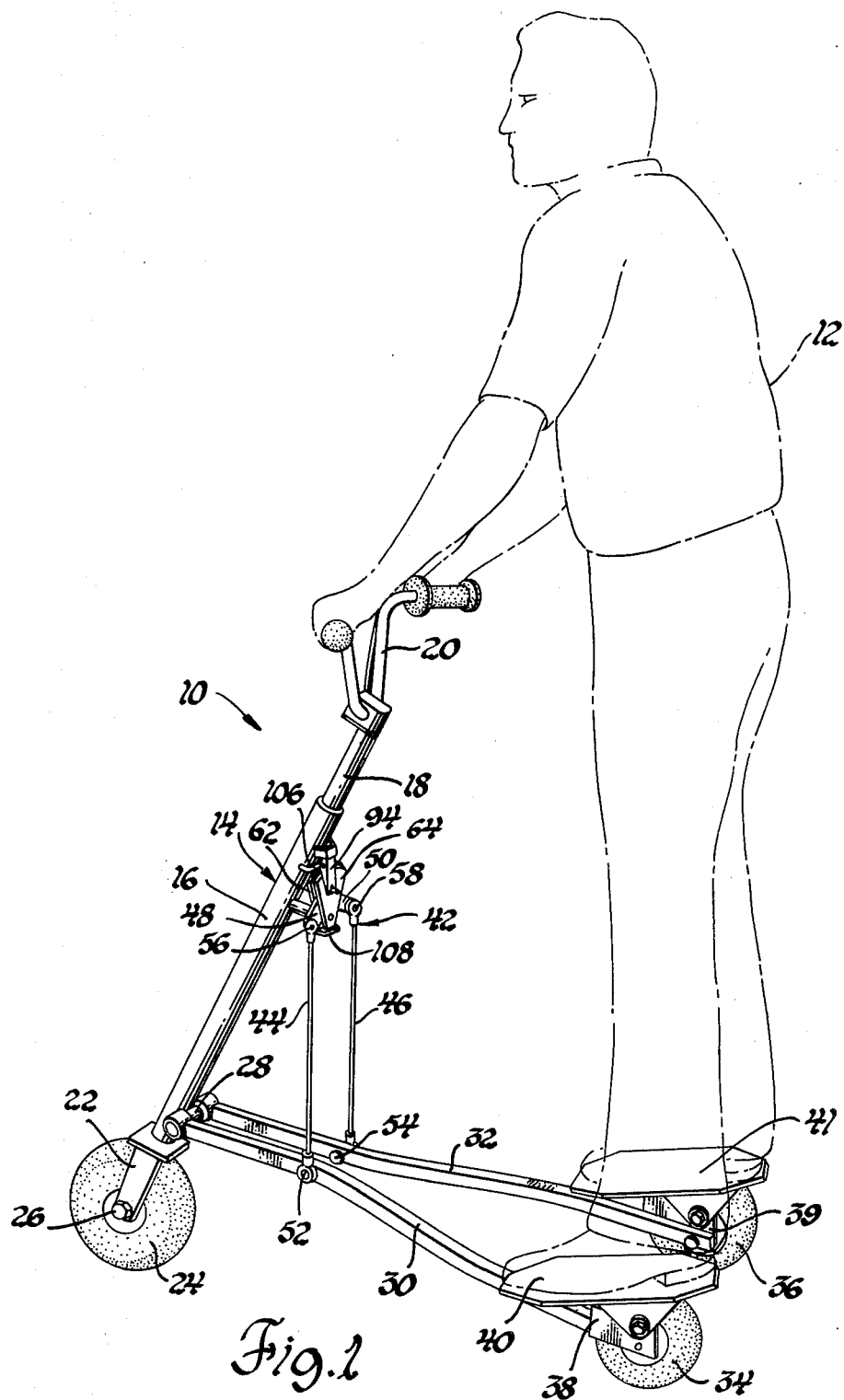

United States Patent [19]

Denzer

[11] 4,050,711
[45] Sept. 27, 1977

[54] CAMBERING DEVICE FOR CAMBERING VEHICLE

[75] Inventor: Richard E. Denzer, Bloomfield Hills, Mich.

[73] Assignee: General Motors Corporation, Detroit, Mich.

[21] Appl. No.: 727,594

[22] Filed: Sept. 28, 1976

[51] Int. Cl.² .................. B60G 19/00; B62K 15/00
[52] U.S. Cl. .......................... 280/278; 280/112 A; 280/221; 280/293
[58] Field of Search .............. 280/87 R, 87 B, 112 R, 280/112 A, 278, 287, 6 R, 6 H, 6.1, 6.11, 200, 210, 218, 220, 221, 224, 21 R, 21 A, 12.1, 12 H, 282, 293; 180/25 R, 25 A, 26 R, 41

[56] References Cited

U.S. PATENT DOCUMENTS

| 1,703,174 | 2/1929 | Roe | 280/287 X |
| 2,593,974 | 4/1952 | Brown | 280/21 R |
| 2,771,145 | 11/1956 | Peters | 180/26 |
| 3,033,585 | 5/1962 | Marston et al. | 280/12.1 X |
| 3,229,782 | 1/1966 | Hilton | 180/26 |
| 3,623,749 | 11/1971 | Jensen | 280/287 X |
| 3,964,563 | 6/1976 | Allen | 180/41 X |

FOREIGN PATENT DOCUMENTS

| 609,578 | 8/1956 | Germany | 280/112 A |
| 454,337 | 1/1950 | Italy | 280/293 |
| 49-42586 | 11/1974 | Japan | 280/87 R |

Primary Examiner—Joseph F. Peters, Jr.
Assistant Examiner—Jack D. Rubenstein
Attorney, Agent, or Firm—Edward J. Biskup

[57] ABSTRACT

A cambering vehicle having pivoted trailing arms interconnected through a cambering device including a two-piece bell crank which has a lever-operated locking pin that allows the trailing arms to be locked together and folded towards the vehicle frame so as to provide a compact package which can be readily stowed.

3 Claims, 7 Drawing Figures

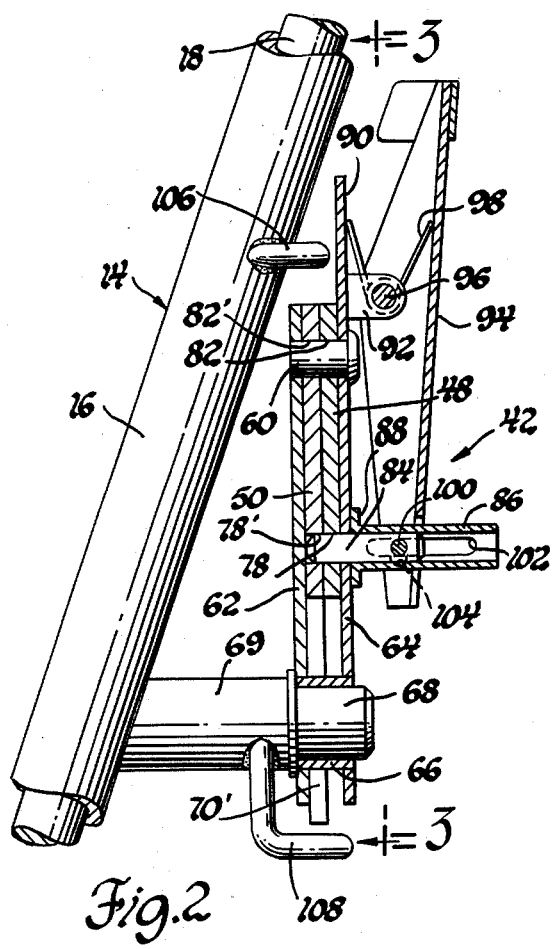
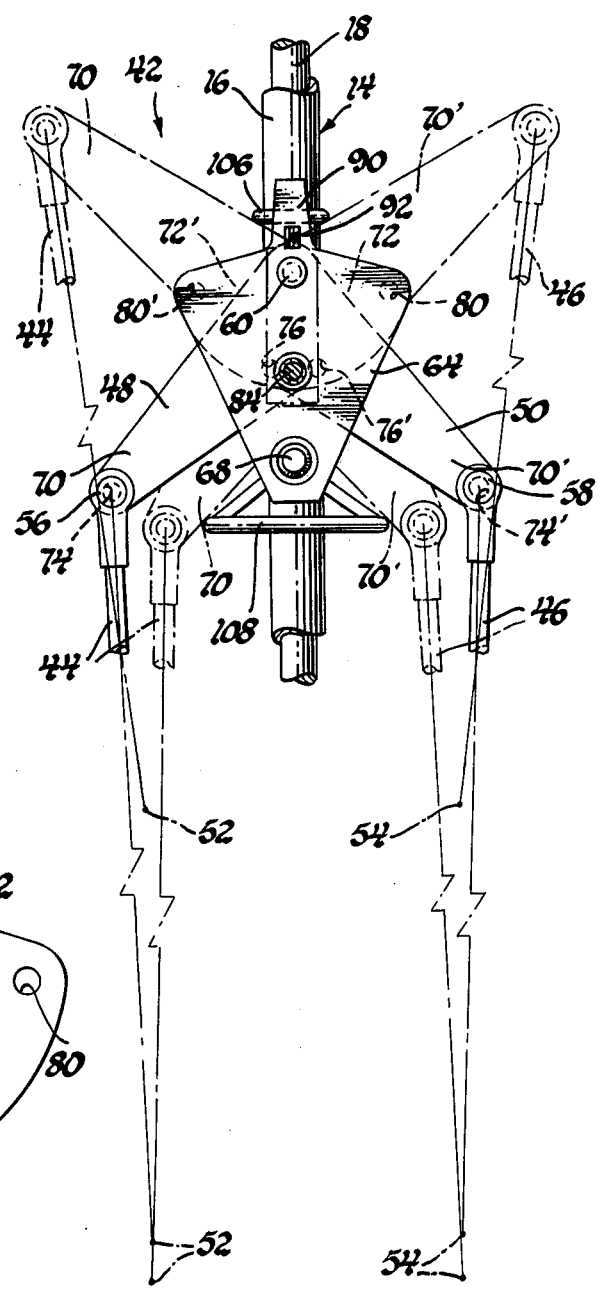
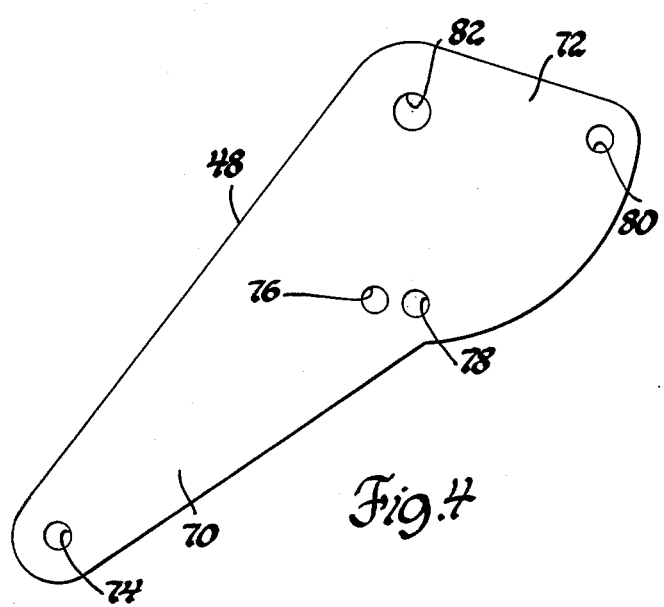

CAMBERING DEVICE FOR CAMBERING VEHICLE

This invention concerns cambering vehicles and more particularly relates to a cambering vehicle having a cambering device that incorporates a bell crank consisting of two separate parts that can be locked in three different positions so as to permit the vehicle to be operated normally, collapsed into a compact configuration, or parked on a level surface.

Copending patent application Ser. No. 713,411, filed Aug. 11, 1976 entitled "Cambering Vehicle" and assigned to the assignee of this invention concerns a cambering vehicle employing a cambering device which allows the trailing arms thereof to be locked relative to each other and folded towads the steering frame so the frame and trailing arms are positioned adjacent each other and extend in generally the same direction. In this manner, the vehicle is collapsible into a low profile configuration and provides a rigid package that can be grasped in one hand and placed in a relatively small compartment such as the trunk of an automobile. Two forms of cambering devices are disclosed by the aforementioned patent application with one employing cables and the other having link members for interconnecting the trailing arms and realizing controlled relative movement thereof as the vehicle negotiates a turn.

This invention is directed to a cambering vehicle of the above-described type in which the cambering device is characterized by having a two-piece bell crank that interconnects the trailing arms and includes a locking arrangement that allows the members of the bell crank to be locked in a predetermined angular relationship so the vehicle can be parked and can be separately moved to two other positions so the trailing arms can be positioned for normal operation of the vehicle and also located adjacent the steering frame for stowage purposes. More specifically, the cambering device according to the invention has the bell crank consisting of a pair of wing members which are mounted in a support member by a pivot pin for independent pivotal movement about a common axis. The wing members are identical in design but mirror images of each other, and each has three holes formed therein the centers of which are located on a circle having its center coaxially with the center of the pivot pin. The wing members are in overlapping relationship with a lock device being carried by the support member. The lock device includes a lever-operated locking pin for securing the two wing members together in a first position wherein the trailing arms are located for normal operation of the vehicle, in a second position wherein the trailing arms are located adjacent the steering frame for stowage purposes, and in a third position so as to allow parking of the vehicle. In each of the aforementioned positions, the wing members assume a predetermined angular relationship that is maintained by having the locking pin extending into a pair of registering holes formed in the wing members.

The objects of the present invention are to provide a new and improved cambering vehicle having pivoted trailing arms and including a cambering device that has a two-piece bell crank mounted in a pivoted support member which carries a locking device for selectively securing the two members of the bell crank in relative positions which allow the trailing arms to maintain a normal vehicle operating position, a stowed position, and a parked position; to provide an improved cambering device for a cambering vehicle having a bell crank consisting of a pair of substantially identical wing members which are independently rotatable about a common axis and can be locked in three different angularly related positions so as to permit the vehicle to be parked, operated in a conventional manner, or collapsed into a low profile configuration for stowage purposes; to provide an improved cambering device for a cambering vehicle which through a lever-operated locking pin allows two independent parts of a bell crank to be rotated into predetermined positions relative to and in engagement with the steering frame for collapsing the steering frame towards the trailing arms and for maintaining the trailing arms in a parked position; and to provide an improved cambering device for a cambering vehicle that has a two-piece bell crank combined with a locking arrangement that allows the vehicle to be placed in a parked condition by moving the steering frame forwardly about its pivoted connection with the trailing arms.

Other objects and advantages of the present invention will be more apparent from the following detailed description when taken with the drawings in which:

FIG. 1 is a perspective view showing a cambering vehicle incorporating a cambering device made in accordance with the invention, FIG. 2 is a side elevational view showing a portion of the cambering device supported by the steering frame of the cambering vehicle of FIG. 1.

Figure 5:
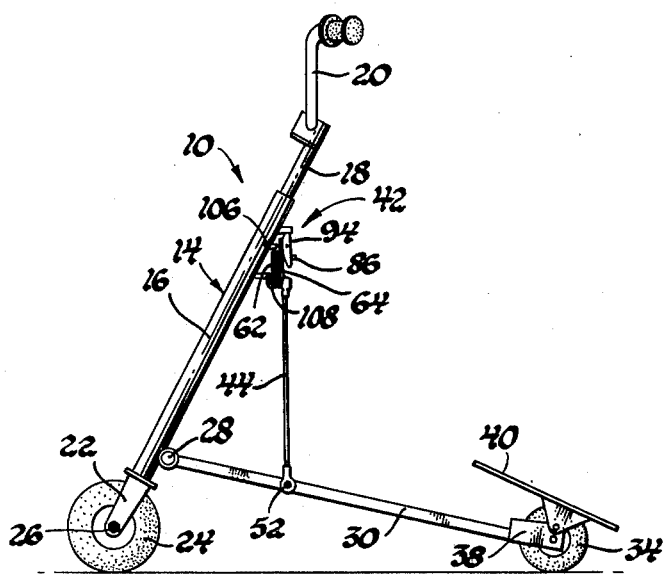
Figure 6:
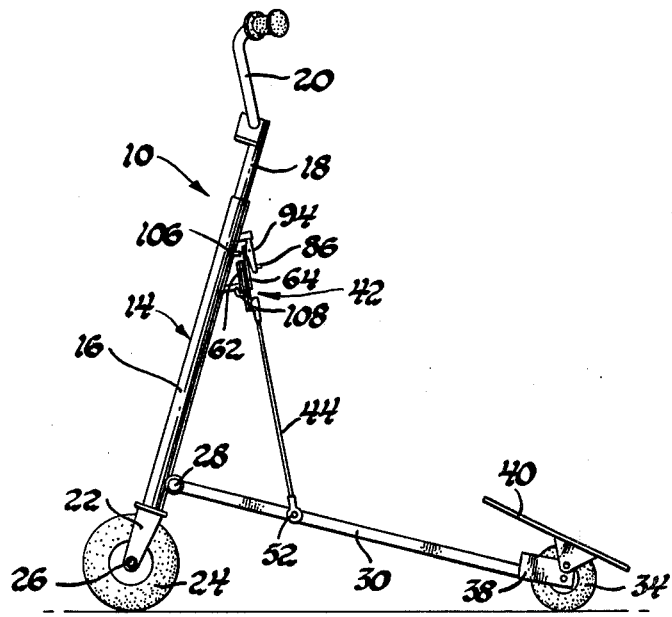
Figure 7:
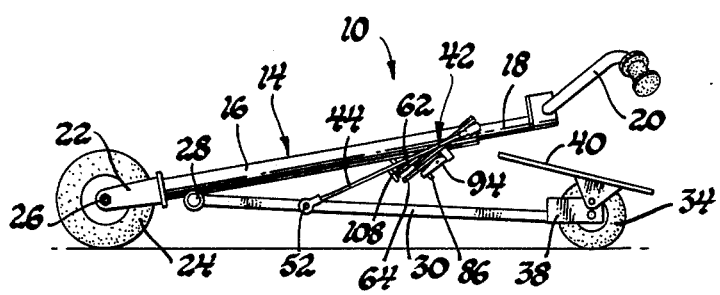

FIG. 3 is a reduced elevational view taken on line 3—3 of FIG. 2 and shows parts of the cambering device in three different positions, FIG. 4 is an elevational view of one of the wing members which forms a part of the bell crank of the cambering device, and FIGS. 5, 6, and 7 are side elevational views of the cambering vehicle with the cambering device in the normal operating position, the park position, and in the stow position, respectively.

Referring to FIG. 1 of the drawings, a cambering vehicle 10 is shown which is adapted to be propelled forwardly by the natural input of a vehicle operator 12 through the timed shifting of his weight from one foot to the other coordinated with the left and right cambered steering of the vehicle in a sinuous path. It will be noted that a vehicle of this type can be seen in copending patent application, Ser. No. 649,967 filed on Jan. 19, 1976 and entitled "Cambering Vehicle," and reference is made to such application for a full understanding of how the vehicle is operated. It will also be noted that although a manually propelled vehicle is shown, an internal combustion engine or an electric motor can be combined with the vehicle for driving the front wheel thereof.

The cambering vehicle 10 comprises a steering frame 14 which includes a tubular column 16 which serves to axially align and rotatably support an elongated steering shaft 18 which extends therethrough. The upper end of the steering shaft 18 is provided with a handle bar assembly 20 while the lower end is formed with a fork 22 which rotatably supports the front wheel 24 of the vehicle. The wheel 24 rotates on an axle 26 which extends transversely through and is supported by the fork 22. The lower end of the tubular column 16 is rigidly formed with a transverse shaft 28, the outer ends of which pivotally support the front ends of a pair of trailing arms 30 and 32 which extend rearwardly and terminate with rear wheels 34 and 36 respectively supported for rotation by a pair of brackets 38 and 39, which in turn, pivotally support foot pads 40 and 41.

A cambering device 42 made according to the invention serves to interconnect the trailing arms 30 and 32 and, when in the normal operating position, ensures that the pivotal movement of the trailing arms 30 and 32 about shaft 28 is equal and opposite. Thus, when the vehicle 10 is leaned into a turn, all wheels remain in contact with the ground and camber by an amount equal to the vehicle roll. More specifically, and as seen in FIGS. 2 and 3, the cambering device includes a pair of links 44 and 46 and a bell crank comprising a pair of wing members 48 and 50. The lower ends of the links 44 and 46 are connected to the front portions of the trailing arms 30 and 32 by transversely extending pivot bolt members 52 and 54, respectively, while the upper ends of the links 44 and 46 are connected to the wing members 48 and 50 by longitudinally extending pivot bolt members 56 and 58, respectively. Each of the pivot bolt members 56 and 58 includes a spherical bearing means (not shown) which allows the upper end of the associated link to pivot about an axis perpendicular to the longitudinal pivot axis of the pivot bolt member. Thus, each of the pivot bolt members 56 and 58 permits universal pivotal movement of the upper end of the associated link member. This allows the steering frame 14 to be folded towards the trailing arms 30 and 32 into the position as seen in FIG. 7.

As seen in FIGS. 2 and 3, the wing members 48 and 50 of the bell crank are supported for pivotal movement by a pivot pin 60 in a support member comprising front and rear triangularly shaped plate members 62 and 64, respectively. The lower portions of the plate members 62 and 64 are secured to a cylindrical bushing or sleeve 66. The sleeve 66 serves to rotatably mount the support member on a reduced cylindrical shaft portion 68 integral with a boss 69 fixed with the column 16.

As seen in FIG. 4, the wing member 48 includes a connecting portion 70 and a body portion 72. The connecting portion 70 has an aperture 74 formed therein that is universally pivotally connected with the upper end of the link 44 by the pivot bolt member 56 as seen in FIG. 1. The body portion 72 has three circular apertures 76, 78, and 80 of uniform diameter and located on a circle having its center coaxial with the center of the pivot pin 60. An aperture 82 is also formed in the body portion 72 of the wing member 48 and serves to accommodate the pivot pin 60. It will be noted that the wing member 50 is identical in construction to the wing member 48 but is a mirror image thereof and that the parts of wing member 50 corresponding to the parts of wing member 48 are identified by the same reference numerals but primed.

When the wing members 48 and 50 are assembled between the plate members 62 and 64 of the support member, they are in overlapping relationship and can be rotated individually about the pivot pin 60 into three positions when in the unlocked condition. The latter mentioned three positions can be seen in FIG. 3 and can be referred to as a stowage position when the connecting portions 70 and 70' are located in the upper most phantom line position, a normal operating position when the wing members 48 and 50 are located in the full line position, and the park position when the connecting portions 70 and 70' of the wing members are located in the lower most position shown in phantom lines. In a normal operating position, the bell crank is free to rotate about shaft 68 and through the links 44 and 46 control the pivoting up and down movement of the trailing arms 30 and 32 about the shaft 28. In the park and stow positions, the bell crank is locked as a unit to the steering frame 14 and through the links 44 and 46 maintains the trailing arms 30 and 32 in fixed positions.

In each of the aforementioned positions, an aperture in wing member 48 will register with an aperture in wing member 50, permitting a lock pin 84 supported within a tubular housing 86 to extend through both apertures for maintaining the wing members in a locked condition. As seen in FIG. 2, the tubular housing 86 has the inner end 88 thereof flared outwardly and secured to the plate member 64. The upper end of the plate member 64 is formed with an extension 90 which rigidly carries a bracket 92 that pivotally supports a hand-operated lever 94 through a transversely extending pivot pin 96. The lever 94 is U-shaped in cross section and a spring 98 is wound about the pivot pin 96 and has the opposed ends thereof engaging the plate member 62 and the lever so as to continuously bias the lever in a clockwise direction around the pivot pin 96. The lock pin 84 is connected to the lower end of the lever through a transverse pin 100 movable in a slot 102 formed in the housing 86 with its major axis parallel to the longitudinal axis of the housing. It will be noted that the ends of the pin 100 are carried by an oblong opening 104 formed in the lever 94 that allows for the rotational movement of the lower end of the lever. Thus, when the wing members 48 and 50 are in the park or lower most position of FIG. 3, the lock pin 84 will extend through the apertures 76 and 76' respectively formed in the wing members 48 and 50 and maintain the latter members in a locked condition. When the wing members 48 and 50 are in the full line or normal operating position, the members 48 and 50 are locked together by the lock pin 84 extending through the apertures 78 and 78', and when the wing members are located in the upper most or stow position, the lock pin 84 will extend through the apertures 80 and 80' to lock the wing members together.

Located above and below the support member and rigidly attached to the column 16 and the boss 69 are a pair of stop members 106 and 108. The lower stop member 108 serves a dual function in that it will limit pivotal movement of the bell crank when the wing members 48 and 50 are located in the full line or normal operating position of FIG. 3 during normal operation of the vehicle 10. In addition, the stop member 108 serves to prevent any pivotal movement of the bell crank about the shaft 68 when the wing members 48 and 50 are located in the lower most or park position as shown in phantom lines. In the park position, the links 44 and 46 will serve to maintain the trailing arms 30 and 32 in fixed relative positions. Similarly, the stop member 106 serves to prevent rotation of the bell crank when the wing members 48 and 50 are located in the upper most or stow position shown in phantom lines in FIG. 3, and again the trailing arms 30 and 32 will be prevented from any relative movement.

From the above description, it should be apparent that the vehicle 10 is operated with the bell crank located in the full line or normal operating position as seen in FIGS. 1, 2, 3 and 5, afterwards, if it is desired to place the vehicle 10 in the parked position of FIG. 6, the operator merely applies a forwardly directed force to the upper portion of the lever 94 so that the latter rotates in a counterclockwise direction (see FIG. 2) about the pivot pin 96. This movement causes the lock pin 84 to be withdrawn from the registering apertures 78, 78' and allows the operator then to push the handle bar assembly 20 forwardly while maintaining his feet on the foot pads 40 and 41 on the trailing arms 30 and 32. The forward movement of the upper end of the steering frame 14 causes the latter to pivot about the shaft 28 in a counterclockwise direction as seen in FIG. 5 and causes the wing member 48 to rotate counterclockwise about pivot pin 60 and the wing member 50 to rotate clockwise into the lower most phantom line position of FIG. 3. At this point, the apertures 76, 76' in the body portion of the wing members 48 and 50 will become aligned and the lock pin 84 will automatically extend therethrough under the influence of spring 98 so as to lock the wing members together and permit the stop member 108 to prevent rotation of the bell crank about pivot shaft 68. If, subsequently, the operator desires to fold the vehicle 10 into the collapsed position of FIG. 7, the lever 94 is pushed forwardly so it again rotates in a counterclockwise direction to retract the lock pin 84 from the registering apertures 76, 76', and while maintaining the lock pin 84 withdrawn, the steering frame 14 is then moved rearwardly about the shaft 28 towards the trailing arms 30 and 32 causing the wing members 48 and 50 to assume the upper most phantom line position of FIG. 3. At such time, the lock pin 84 is permitted to extend into the aligned apertures 80, 80' and the stop member prevents any rotation of the support member of the bell crank about the shaft 68. It will be noted that the relative locations of the pivotal connections between the links 44 and 46, the bell crank, and trailing arms 30 and 32 will determine the extent to which the steering frame 14 will move towards the trailing arms. In other words, by proper positioning of the pivot connections and proper dimensioning of the links and bell crank, it is conceivable that the steering frame 14 can be collapsed into a position wherein it is substantially parallel to the trailing arms 30 and 32. In such case, the handle bar assembly 20 would engage the foot pads 40 and 41 so as to prevent any relative movement of the trailing arms 30 and 32 and the stop member 106 would not be required.

Various changes and modifications can be made in this construction without departing from the spirit of the invention. Such changes and modifications are contemplated by the inventor and he does not wish to be limited except by the scope of the appended claims.

I claim:

1. In combination with a cambering vehicle having an upright steering frame provided with a pair of pivotally supported trailing arms, a mechanical cambering device for interconnecting the trailing arms so that they move in equal and opposite directions in parallel planes when the vehicle is leaned into a turn, said cambering device including a support member connected to said frame for pivotal movement about a first axis, a bell crank comprising a pair of members, pivot pin means mounting said members in said support member, each of said members supported by the associated pivot pin means for independent pivotal movement about an axis spaced from said first axis, a pair of links, means pivotally connecting one of said links between one of said members and one of said trailing arms, means pivotally connecting the other of said links between the other of said members and the other of said trailing arms, each of said members having a plurality of openings formed therein located on a circle having its center at the center of said pivot pin means, a lock pin carried by the support member and adapted to be located in said openings formed in said members so as to selectively lock said members together in a first position wherein said trailing arms are located for normal operation of said vehicle and in a second position wherein said support member is prevented from pivoting about the first axis so as to allow said vehicle to be parked on a level surface.

2. In combination with a cambering vehicle having an upright frame the lower portion of which is provided with a pair of pivotally supported trailing arms, a mechanical cambering device for interconnecting the trailing arms so that they move in equal and opposite directions in parallel planes when the vehicle is leaned into a turn, said cambering device including a support member connected to said frame for pivotal movement about a first axis, a bell crank comprising a pair of overlapping members mounted in said support member for independent pivotal movement about a second axis which is parallel to said first axis, a pair of links, means pivotally connecting one of said links between one of said members and one of said trailing arms, means pivotally connecting the other of said links between the other of said members and the other of said trailing arms, each of said members having three openings formed therein located on a circle having the second axis as its center, a spring biased lock pin carried by the support member and adapted to be located in said openings formed in said members so as to selectively lock said members together in a first position wherein said trailing arms are located for normal operation of said vehicle and in a second position wherein said trailing arms are located adjacent said frame for stowing said vehicle in a minimum of space, and in a third position wherein said support member is prevented from pivoting about the first axis so as to allow said vehicle to be parked on a level surface.

3. In combination with a cambering vehicle having a steering frame the upper portion of which has a handle bar assembly and the lower portion of which is provided with a pair of trailing arms supported for pivotal movement about a transverse shaft, a mechanical cambering device for interconnecting the trailing arms so that they move in equal and opposite directions in parallel planes when the vehicle is leaned into a turn, said cambering device including a support member connected to said frame for pivotal movement about a first axis, a bell crank comprising a pair of overlapping identical members mounted in said support member for independent pivotal movement about a second axis which is parallel to said first axis, a pair of links, means pivotally connecting one of said links between one of said members and one of said trailing arms, means pivotally connecting the other of said links between the other of said members and the other of said trailing arms, each of said members having three openings formed therein located on a circle having the second axis at its center, first and second stop members respectively located above and below said support member, a lever-operated lock pin carried by the support member and adapted to be located in aligned openings formed in said members so as to selectively lock said members together in a first position wherein said trailing arms are located for normal operation of said vehicle and in a second position wherein said trailing arms are located adjacent said frame and said members contact said first stop member for stowing said vehicle in a minimum of space, and in a third position wherein said members contact said second stop member and allow said vehicle to be parked on a level surface, the arrangement being such that said members are movable from the first position to the third position by causing the steering frame to pivot forwardly about the transverse shaft relative to the trailing arms.

* * * * *